United States Patent Office 3,369,262
Patented Feb. 20, 1968

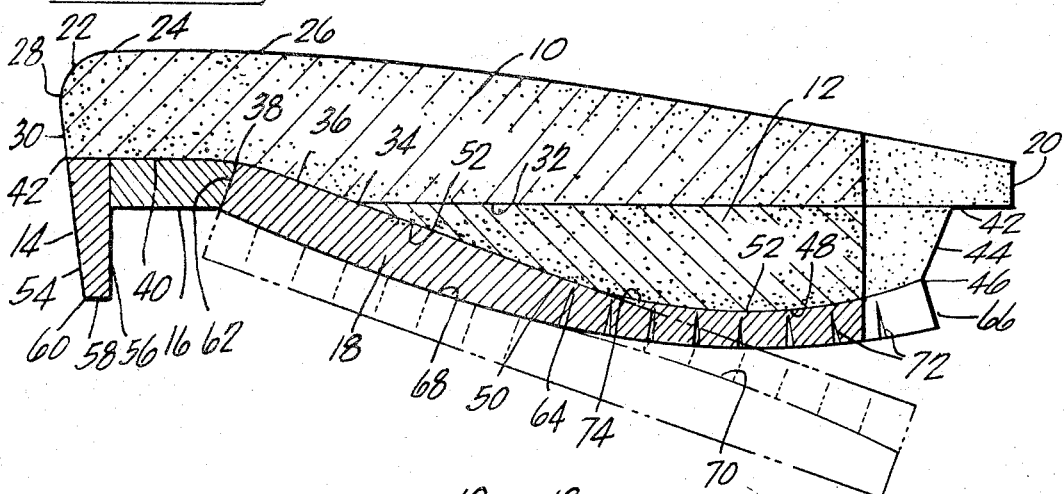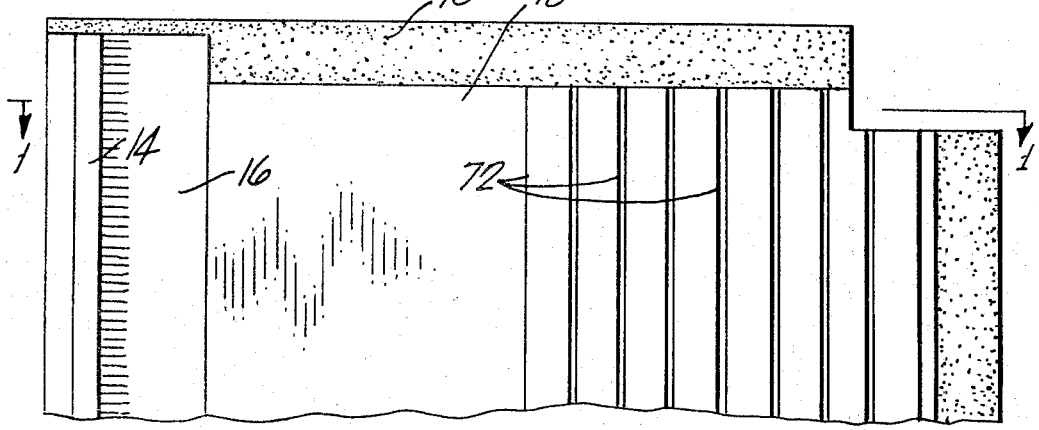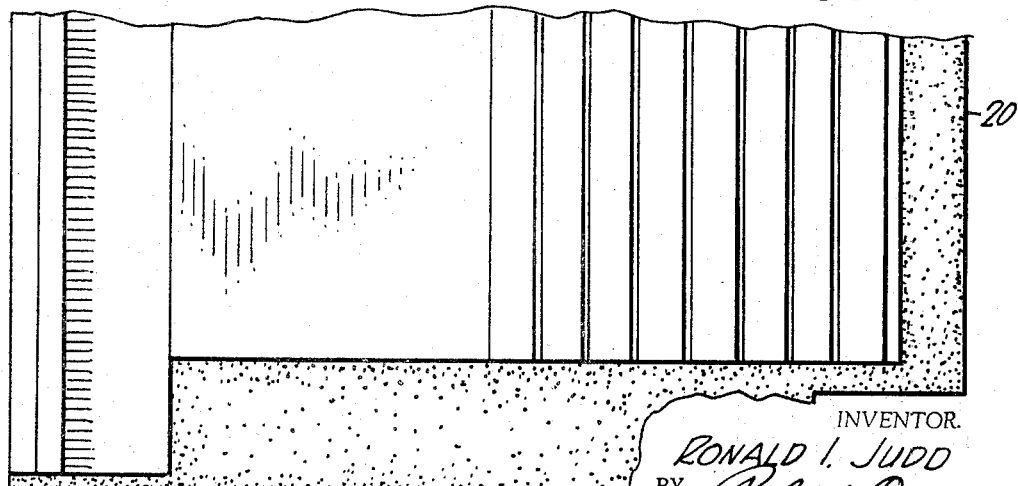

3,369,262
FLOTATION CUSHION
Ronald I. Judd, Anaheim, Calif., assignor, by mesne assignments, to McDonnell Douglas Corporation, Santa Monica, Calif., a corporation of Maryland
Filed Sept. 27, 1966, Ser. No. 582,354
7 Claims. (Cl. 9—12)

The present invention relates to a flotation cushion. More particularly, it relates to a flotation cushion for supporting a passenger of an aircraft in flight and for providing sufficient buoyancy to uphold a passenger in water in the event of an emergency.

It is now a requirement in aircraft seat cushions that they have a buoyancy level sufficient to support a person in water. This has been defined as that buoyance required to support not less than fourteen pounds in fresh water at 85° F. for a period of eight hours. Without waterproof covers, which are susceptible to puncture, most present-day seat cushions will not meet this requirement.

In order to provide comfort, and seating support, at the lightest possible weight, aircraft seat cushion manufacturers in the past have used a flexible resilient open-cell cellular foam material such as a polyurethane foam, for example. There are over 400 types of resins in the polyurethane family that have been used as a cushioning material. Polyurethane foam, however, soaks up water readily and is used as household sponges and mops. Since it does not provide the required buoyancy level, slabs of buoyancy material must be place therein or connected therewith to form a buoyant cushion.

A closed-cell cellular material having a specific gravity less than that of water, such as a polystyrene expanded bead material, may be used for flotation. This bead material consists of individual closed-cell beads which become expanded in a fabrication process and, through bonding of the beads together, a rigid structure is obtained. Such structure is found in thermal insulated drinking cups and for packaging of delicate instruments and, because of its flotation characteristic, it is found in swimming pool use. To meet the flotation criteria of passenger seats in aircraft, it has been calculated that 300 cubic inches of closed-cell expandable polystyrene material per seat is necessary. To retain passenger comfort, this material must be hidden in the cushion by placing slabs on the bottom with the polyurethane open-cell foam over it, with additional pieces placed in areas that would not provide excessive discomfort. The problem then becomes one of adding a flotation characteristic to an open-cell cushion without departing from the comfort features of the cushion, and to do this at a minimum cost of labor and materials and at a minimum of weight.

Perhaps the easiest and most simple manner of combining closed-cell flotation material with the open-cell foam material would be to form a sandwich with a layer of closed-cell material on the bottom. Both materials would be of constant thickness, resulting in a stiffer-than-normal cushion with less than normal amount of cushion material at the rear where the pressure of the occupant is the greatest. Such a cushion would have less than the normal effective slope for optimum comfort.

The flotation cushions made in accordance with the present invention, constitutes an improvement over such cushions by reducing the stiffness of the flotation material through the use of slits to allow the flotation material to follow a desired contour and to allow the cushion to bend to fit a flexible support; by increasing the thickness of the cushion material at the rear and reducing the thickness at the front, thereby increasing the effective slope; and by reducing the cost of flotation material by eliminating waste when the thickness required would not permit uniform cuts from the various slab thicknesses presently available.

Seat cushions developed in accordance with the present invention are provided with sufficient closed-cell material to meet the flotation requirements, with the closed-cell material so distributed within the cushion that the cushion is more comfortable, rather than less comfortable, while minimizing or eliminating scrap pieces of closed-cell material. Cushion comfort, for this purpose, is achieved by providing a combination of density, thickness, and contour such that the passenger, when seated, may experience a significant penetration onto the cushion without bottoming, and with an adequate effective slope.

An object of the present invention is the provision of a light-weight seat cushion having comfort, seating support and flotation qualities.

Another object is the provision of a flotation cushion combining a stiff flotation material with a resilient open-cell foam material to create a flexible form-fitting cushion.

Another object is the provision of a flotation cushion combining an open-cell foam material with a closed-cell cellular material to provide comfort and body support with a flotation capability.

Another object is the provision of a flotation cushion wherein an effective slope is provided without waste of flotation material.

Other objects and advantages will become readily apparent as a description of a preferred embodiment proceeds, having reference to the drawings, wherein:

FIG. 1 is an elevational view taken in cross section along the line 1—1 of FIGURE 2; and FIG. 2 is a plan view showing the bottom of the flotation cushion.

Referring now to the cross sectional view of FIG. 1, the cushion consists of five pieces of material bonded together. These pieces consist of a top portion 10 and a wedge 12 of open-cell cellular foam material, such as polyurethane, for example, and a front piece 14, a filler strip 16 and base 18 of closed-cell cellular material, such as polystyrene beads, for example. The top portion 10 is made from a blank 3 inches thick, 19 inches deep, and 20.4 inches wide. The rear face 20 of the top portion 10 of the seat cushion is ¾ inch thick. The front top edge 22 is rounded to conform to a curvature having a one-inch radius between edge 24 on the top surface 26 and the leading edge 28 of front face 30. The top surface 26 is formed with a concave curvature having a 73⅛ inch radius. The bottom surface 32 is substantially horizontal, extending from the lower edge of rear face 20 forwardly 13²⁹⁄₃₂ inches to edge 34. Along this edge a cut is made upwardly and forwardly to provide a tapered slope surface 36 having a rise of 1³⁄₁₆ inch over a forward distance of 2³⁷⁄₆₄ inches. This slope terminates along edge 38 at which point the undersurface 40 extends horizontally to the front face 30 of the material to form an edge 42. This undersurface 40 is 2³⁄₁₆ inches below edge 24 on the top surface 26.

Wedge 12 is bonded to the bottom surface 32, extending rearwardly from edge 32, a distance of 12²¹⁄₃₂ inches, terminating at edge 42. The back face 44 of wedge 12 tapers downwardly and forwardly, downwardly 1½ inches and forwardly ⅝ inch to edge 46. The lower surface 48 of wedge 12 follows a 10¹³⁄₁₆ inch radius of curvature from edge 46 to edge 50 which is horizontal thereto. The radius center line for determining this surface extends rearwardly 8¹³⁄₃₂ inches from edge 34. The center of curvature on this center line is 10¹³⁄₁₆ inches from edge 46. The surface curvature extends downwardly between edges 46 and 50 to a point 52 which is ⅝ inch below the edges forming the lowermost portion of the wedge 12. From edge 50 to edge 34, the undersurface 52 is a plane surface and becomes an extension of the tapered surface 36 of the top portion 10.

It should be noted that the lowermost point 52 of the open-cell material is 5⅛ inches below the uppermost edge 24 at the front of top surface 26. This permits the occupant's body to tilt slightly rearwardly to assume a more comfortable position. The forward portion of the resilient material is less thick since it supports the legs of the occupant and not the rest of the body which is much heavier. It should be further noted that in top portion 10 and wedge 12, some waste material will occur in making the irregular configuration just described. However, this material is open-cell cellular foam material and the scrap portions thereof are not wasted. Such material can be used as filler material for pillows, mattresses, stuffing for toys and has many other uses.

From the foremost forward edge 28 of top portion 10 the front face 30 extends downwardly 1 3/16 inches and inwardly ⅛ inch to edge 42. Extending from this edge rearwardly ⅞ of an inch are the abutting surfaces of the top portion 10 and the front piece 14 which are bonded together. Front piece 14 is made from a ⅞ x 2 13/16 x 19.90 strip of closed-cell material having a specific gravity less than that of water, such as polystyrene, for example. The front face 54 of piece 14 tapers inwardly ⅜ inch whereas the back face 56 extends straight downwardly 2 13/16 inches, leaving the bottom surface 58 with a thickness of ½ inch. The lower forward edge 60 of the front piece 14 thus extends rearwardly ½ inch from the foremost forward edge 26 of top portion 10.

Filler strip 16 extends transversely across the undersurface 40 of top portion 10 and in abutment with back surface 56 or front piece 14. The strip is 61/64 inch thick, 1 33/64 inches wide at the surface of bonding to undersurface 40 and tapers 19/64 inch to a width of 1 14/64 inches along its lower surface 62. It is 19.90 inches long, as is front piece 14, both being inset ¼ inch from each side of the cushion.

Base 14 is formed from a 2 inch slab cut 15⅛ inches wide and 16½ inches long. From such a piece, two identical bases may be made so that there is absolutely no waste in material. The two base portions are formed by making a 30 inch radius cut through the middle from one side of the base and completing the cut on a 30 inch radius from the other side of the base. This, then, provides a base having a front face 62, mid-point 64 and rear face 66 of one-inch thickness. The lower surface 68 is concave and the cushion has a thickness of somewhat larger than one inch along the forward one-half of the base. The rear half of the base presents a thickness of less than one inch, it having been cut on a 30 inch radius from the other side. This provides a convex surface 70, shown in phantom lines, for the rear one-half of the base. Next, eight slits 72 are cut from the bottom surface upwardly to such depth as to leave 3/16 inch from the top surface 72 of the rear half of base 18. The rear half can then be bent upwardly to be joined with the lower surface 48 of wedge 12. The slits 72, as just described, permit the cushion to have flexibity and to bend to fit a flexible support.

FIG. 2 shows the flotation cushion from the bottom. The top portion 10 of the cushion is 20.4 inches wide except for the 2 x 3 inch segments removed from each of the rear corners. The wedge 12 is 16⅓ inches long as is base 18. These are inset from one side 1¼ inches and from the far side 2.65 inches. Front piece 14 and filler strip 16 terminate ¼ inch from each side. The slits 72 extend transversely across the width of the base 18.

Having thus described a preferred embodiment of the invention, it is to be understood that such embodiment was described for illustrative purposes only and that the scope of the present invention is not limited thereto. Having disclosed a preferred embodiment, it will readily occur to one skilled in the art of other modifications and variations, and it is to be understood that these deviations from the preferred embodiment are to be considered as part of the invention as defined by the appended claims.

What is claimed is:
1. A flotation cushion comprising:
a top portion of open-cell cellular foam material;
said top portion having a wedge of similar material extending along the rear portion of the lower surface thereof; and
a base of closed-cell cellular material having a specific gravity less than that of water;
said base having a rigid front half having a thickness greater than its rear half, the rear half being curved to fit against said wedge.
2. A flotation cushion as in claim 1,
the rear half of said base having transverse slits in the bottom thereof to permit upward curvature of said rear half.
3. A flotation cushion as in claim 1,
said base having an equal thickness at its front face, rear face, and transversely at a mid-point between said front and rear faces;
the front half being of greater thickness and the rear half being of lesser thickness than said equal thickness.
4. A flotation cushion as in claim 3,
the bottom surface of the front half of said base following a radius of curvature from above said base to provide a concave curvature;
the bottom surface of the rear half of said base following a radius of curvature from below said base to provide a convex curvature, whereby two identical bases may be formed from one blank of material of twice said equal thickness.
5. A flotation cushion as in claim 1, and
a front piece and filler strip extending transversely across the front undersurface of said top portion;
said front piece and filler strip being of a closed-cell cellular material having a specific gravity less than that of water;
said top portion having sufficient thickness above said front piece and filler strip that it will not bottom out against said front piece and filler strip under the weight of the legs of an occupant on said cushion.
6. A flotation cushion as in claim 5,
said front piece, filler strip and base comprising a minimum of 300 cu. in. of closed-cell material.
7. A flotation cushion as in claim 1,
said wedge and said top portion having a sufficient thickness to permit the occupant thereof to sit with a slight rearward incline without bottoming against said base under the weight of said occupant.

References Cited

UNITED STATES PATENTS

| | | | |
|---|---|---|---|
| 2,411,412 | 11/1946 | Blair et al. | 297—458 X |
| 3,000,020 | 9/1961 | Lombard | 5—355 |
| 3,099,482 | 7/1963 | Woodruff | 9—312 X |
| 3,142,515 | 7/1964 | Wall et al. | 297—452 |
| 3,268,926 | 8/1966 | Talalay | 9—12 |

MILTON BUCHLER, *Primary Examiner.*

T. MAJOR, *Examiner.*